Aug. 25, 1964 C. J. MALONEY ETAL 3,146,341

FILM READER

Filed March 17, 1961 5 Sheets-Sheet 1

INVENTORS
Clifford J. Maloney
Lee F. Miller

BY Clifford T. Hultin

ATTORNEY

FILM READER

Filed March 17, 1961 5 Sheets-Sheet 2

INVENTORS
Clifford J. Maloney
Lee F. Miller

BY Clifford T. Hultin
ATTORNEY

Aug. 25, 1964 C. J. MALONEY ET AL 3,146,341

FILM READER

Filed March 17, 1961 5 Sheets-Sheet 3

INVENTORS
Clifford J. Maloney
Lee F. Miller

BY Clifford T. Hultin

ATTORNEY

INVENTORS
Clifford J. Maloney
Lee F. Miller

BY Clifford T. Hultin
ATTORNEY

FILM READER

Filed March 17, 1961 5 Sheets-Sheet 5

INVENTORS
Clifford J. Maloney
Lee F. Miller

BY Clifford T. Hultin

ATTORNEY

United States Patent Office 3,146,341
Patented Aug. 25, 1964

3,146,341
FILM READER

Clifford J. Maloney and Lee F. Miller, Frederick, Md., assignors to the United States of America as represented by the Secretary of the Army Filed Mar. 17, 1961, Ser. No. 96,622
8 Claims. (Cl. 235—61.11)
(Granted under Title 35, U.S. Code (1952), sec. 266)

The invention described herein may be manufactured and used by or for the Government of the United States of America for governmental purposes without the payment to us of any royalty thereon.

This invention relates to a device for processing and totalizing electronic pulses originating by the passing of light through transparent dots in an opaque medium. Such electronic pulses may then be used for the control of devices for recording such totalized and converted information, including card punches, tape punches, magnetic recorders and the like, and for the detection and elimination of errors in the information being processed.

More specifically, the invention comprehends a plurality of channels for detecting light pulses. Thus one channel may be used to detect pulses used for monitoring purposes, whereas a second channel detects pulses from a data source.

More specifically, the invention includes means for processing such detected pulse information through a plurality of channels. Thus, one processing channel may serve to accumulate a selected area pulse count into a single total for each cycle. Conversely, other channels may classify other pulse information into a series of separate totals that are independently registered for identification or other purpose.

A more specific embodiment of the invention relates to a mechanism capable of counting and registering certain information appearing as transparent dots on an opaque unit of film.

Each unit of film is identified by a number and the total number of dots in the "field" which constitutes the information on the film is added up and transferred to a card or other storable medium.

The film used in this reader is non-perforated 35 mm. film. The image on this film results from photographing a perforated "Teflon" strip as disclosed in U.S. Patent No. 2,771,398. After inoculating and incubating, the strip is photographed in a special apparatus which provides indirect illumination from the rear of the strip as well as a black box behind the strip when viewed from the camera. When viewed in this apparatus, the translucent Teflon material of the strip and the turbid positive cells appear illuminated because of scattered light, while the transparent negative cells are almost completely dark because of the black box behind the strip.

These Teflon strips have a series of 82 trigger perforations along the margin of the strip. Three of these 82 perforations constitute leading triggers and three are trailing triggers. The fourth to seventh trigger positions are used to introduce four rows of dots representing respectively the thousands, hundreds, tenths and units integers of an identifying number for the strip. Following these seven triggers, there is an eighth intervening trigger after which the ninth to seventy-ninth triggers introduce the data field. This field is composed of 71 rows with 14 possible dots per row. Following this are the three trailing triggers that complete the scan of one unit. The 82 trigger positions are rendered permanently opaque by filling the perforations with an opaque plug. Similarly, the identification field following the fourth to the seventh triggers is produced by perforating the number of positions necessary to designate the desired units, tenths, hundreds and thousands integers of the identifying number, after which these perforations are filled with opaque material as above. The field perforations including the 71 rows with 14 perforations per row is filled with nutrient solution and where the solution is fertile and incubation takes place it produces a turbid spot. Where the solution is sterile, on the other hand, a clear spot results.

When this Teflon strip is photographed over the black box with indirect lighting as referred to above, the Teflon strip and the fertile holes appear light and translucent due to light scattering. The plugged holes appear black as a matter of course and the clear holes also appear black due to the black box background. Accordingly, the plugged trigger holes and the clear field holes appear as clear spots on the negative film. These spots pass the light and accordingly result in a pulse. Thus the scanning of the data field results in a counting of the number of sterile positions per row. These can be added as such or they can be subtracted from the total number of positions to give the fertile count, if preferred.

This reading and counting is accomplished by a mechanism shown in the drawings of which FIG. 1 is a schematic of the general film scanning arrangement together with a labeled block diagram of the circuit units up to and including the Remington Rand punch which transfers the data on one film strip to a single punched card.

Figure 1:
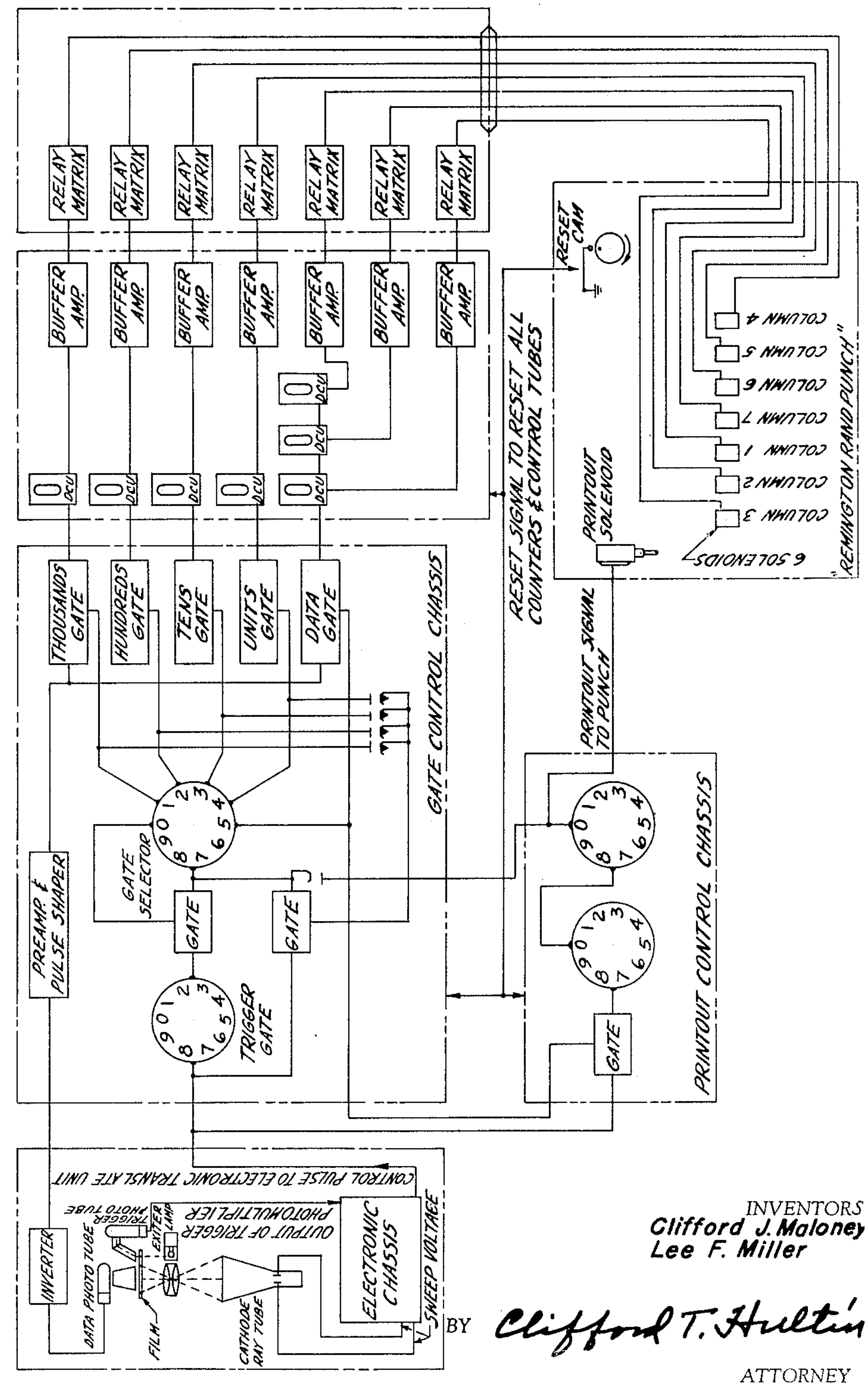

In the film scanning arrangement of FIG. 1, the parts are labeled to show the general structure and operation. Thus the exciter lamp focuses a beam of light on the row of 82 trigger perforations along the side of the film. As the film moves, the light beam passes through the trigger perforations which activates the trigger photo tube. The resulting pulse is tailored by the circuit of FIG. 2, which circuit serves to activate the deflection amplifier and cause the cathode ray tube to sweep the data field of the film. Since the film is constantly moving, the cathode ray tube includes only horizontal deflection and the movement of the film during any one sweep makes little difference since the film advances only .005 in. during each scanning cycle. Hence, when the trigger photo tube senses a trigger dot, the scanning sweep is activated and completes the sweep before the film has progressed beyond the row of data dots in line with the given trigger dot. Wherever there is a clear dot in any data row, the scanning beam passes through the film and activates the data photo tube. This photo tube passes a pulse which enters the data input 150 of the control circuit of FIG. 3. If this pulse is from the data field, it is transmitted and registered as a total at the completion of the scanning of the entire field. If the pulse is from the scan following the fourth to the seventh trigger dots, each row is added separately and entered as the thousands, hundreds, tens or units digits of an identifying number for the film.

Figure 2:
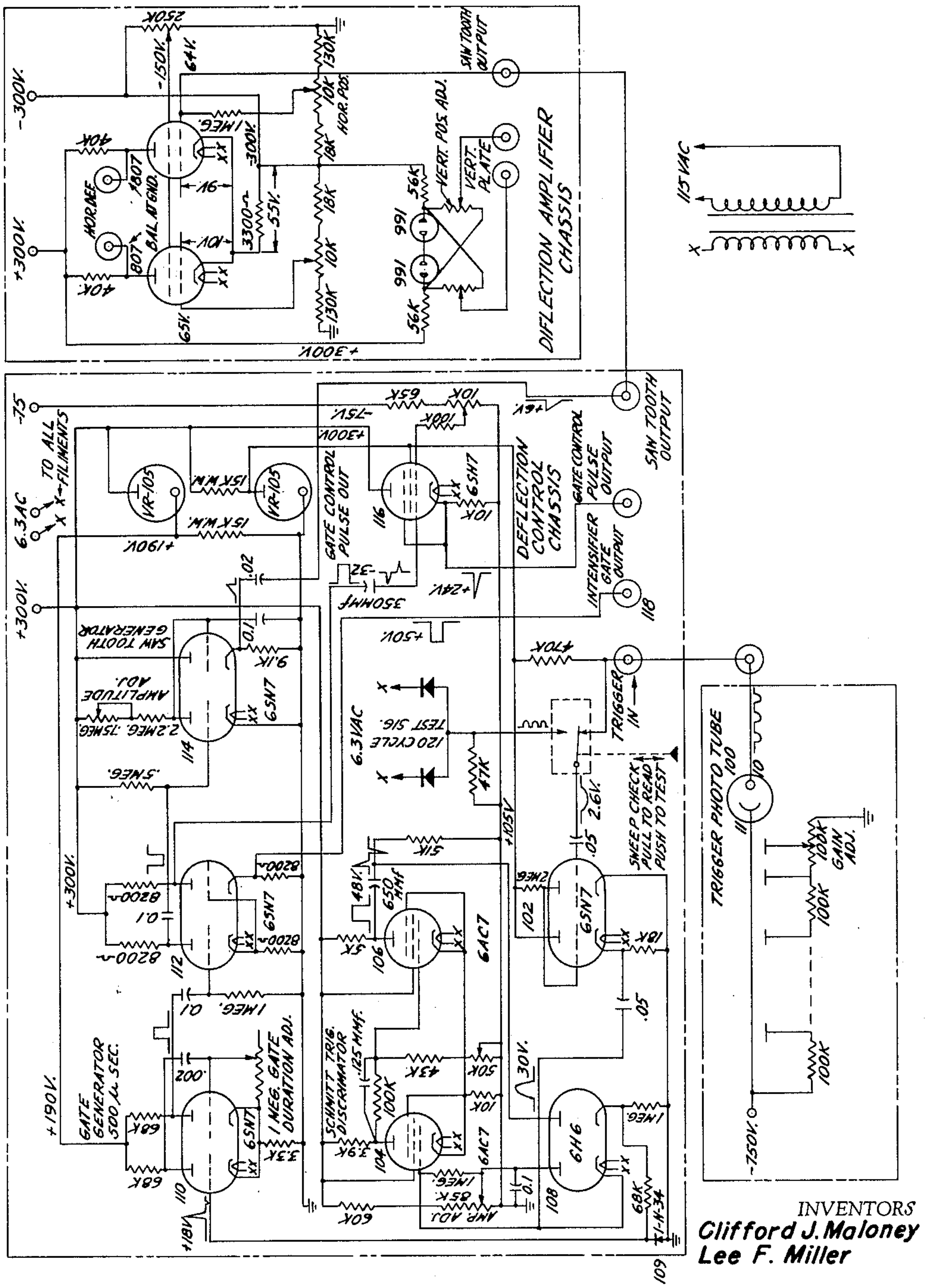
FIG. 2 shows the deflection and control circuit.

More specifically, FIG. 2 shows a circuit wherein the pulses originate in the trigger photo tube 100 with a voltage of about 2.6 v. as shown. This is amplified in the first half of the double triode 102 and passed on as a low impedance pulse by the second half of this tube which functions as a cathode follower. The resulting 30 volt pulse passes to the control grid of the pentode 104 which functions as the first half of a Schmitt Trigger Discriminator. This first pentode 104 is biased at cutoff whereas the second pentode 106 is heavily conducting. With the rise of the signal on the grid of 104, it suddenly becomes conducting whereupon 106 cuts off. This results in a square wave output as shown. The latter is differentiated through the 650 mmfd. condenser and emerges as the + and — spike shown. The negative portion of this spike is removed by the second half of diode 108 and this signal is clamped to ground through diode 109 to insure that only a + spike remains. The control grid of 104 is floated above ground by means of the 85K potentiometer. By this means it is possible to set the bias so as to exclude unwanted pulses and noise from the circuit. The control grid of pentode 104 is further clamped by the first half of the double diode 108. The + spike is fed to the first half of double triode 110 and renders it conducting, which in turn causes the second half to cut off, again resulting in the square wave shown. The duration or dwell of this wave is determined by the 1 meg. gate duration adjustment and is set for about 500 μsec. This square wave passes into the cathodyne phase inverter consisting of the first half of double triode 112 which carries equal plate and cathode loads. The inverted square wave passes into the first half of the double triode 114. This tube is a gated saw tooth generator and has a grounded cathode and a high value plate resistance. Its grid is tied to the 300 volt plate supply by means of a 0.5 meg. resistor. The result is a fairly high static plate current that creates a very large voltage drop and brings the voltage on the plate down to a very nominal value. The grid and cathode voltages will be very nearly equal. The output of this first triode 114 is direct coupled to the grid of the second triode which functions as a cathode follower output. When the negative square wave arrives at the first grid of 114, it instantly drives it to cutoff with a resulting rise in plate voltage. This in turn creates a rise in grid voltage of the second tube, but the rise here is gradual due to the presence of the 0.1 mfd. capacitor to ground. The rate of this rise is determined by the RC period of this capacitor and the plate resistor of the first half of 114. The cathode follower output of the second half of 114 is the sawtooth shown and the amplitude thereof can be determined in part by the 0.75 meg. amplitude adjustment on the first plate of 114. This sawtooth is used to drive the deflection amplifier and the horizontal sweep.

Returning to double triode 112, two square wave signals are taken from the second half of this tube. One of these, taken from the second plate, is differentiated through the 350 mmfd. condenser and passed to the control grid of pentode 116. This tube is operated as a cathode follower with a fixed negative bias on the grid sufficient to bias the tube to cutoff. Since the leading spike of the differentiated incoming signal is negative it has no effect on the cutoff condition of the tube but the positive spike biases the tube into the conducting region and passes this portion of the signal. This positive spike coincides with the trailing edge of the sawtooth gate and is used as a control pulse. This control pulse which is introduced as terminals 170 and 172 assures that all gating is accomplished during the period of retrace of the cathode ray beam before the next scan is initiated.

Another square wave from the second cathode of 112 passes to the intensifier output gate 118. This is a positive square wave and is applied to the grid of the cathode ray tube to intensify the beam during the sweep. When this square wave voltage is applied to the grid, the beam intensity rises to the required value to scan the film. At the completion of the sweep, the beam is cut off during retrace.

Figure 3:
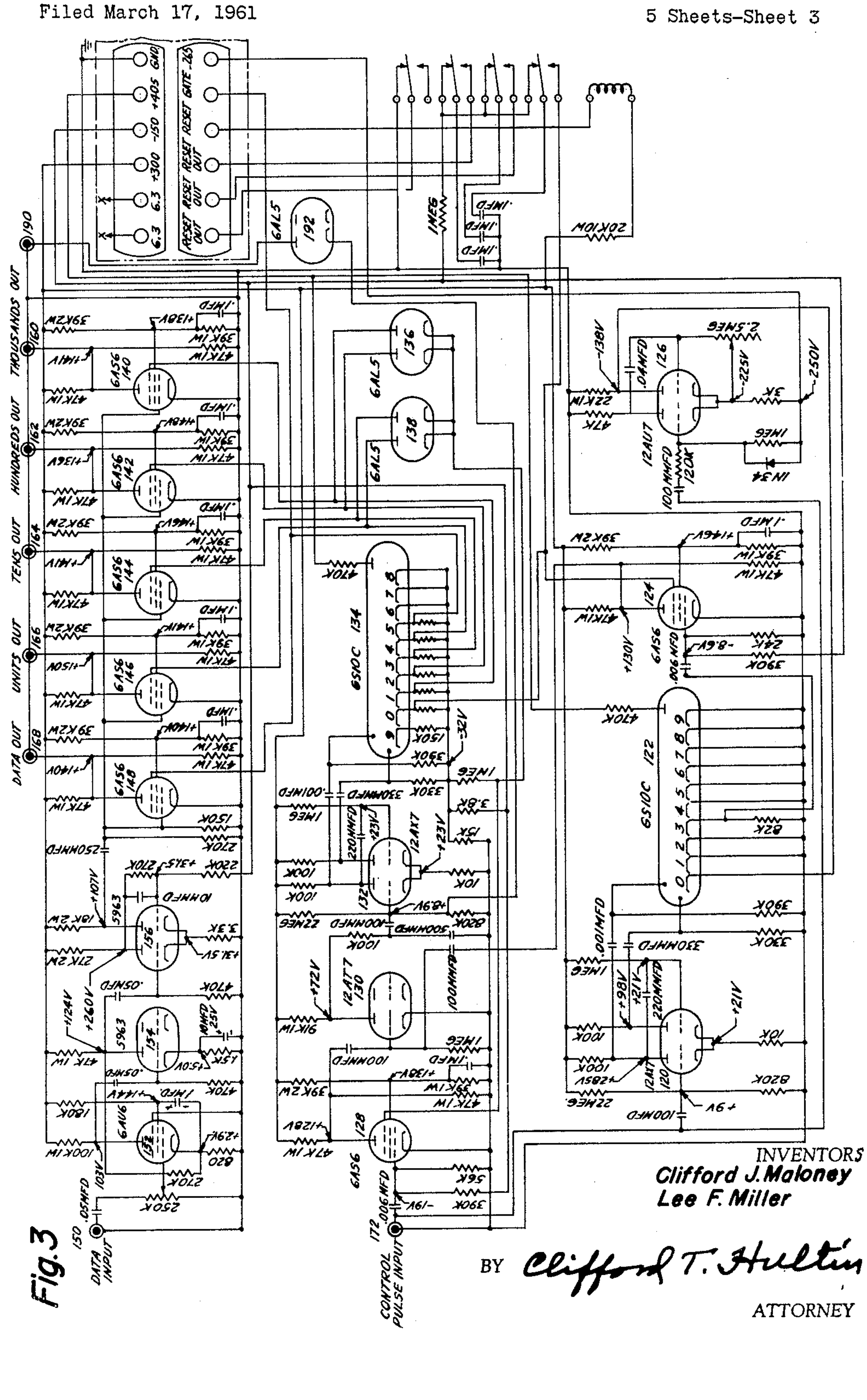
FIG. 3 shows the basic control circuit.

FIG. 3 shows the basic control circuit having two channels, one to process the control pulses arriving from tube 116 (FIG. 2) and the other to process the data pulses arriving from the data photo tube. All data pulses are amplified in tubes 152, 154 and 156 after which they are fed simultaneously into pentodes 140 to 148. Only one of the latter pentodes are unblocked at any one time, however, hence the pulses are directed to the respective output jack depending upon the origin of the data pulses. The purpose of the control pulses is to gate these various tubes so that the data pulses are directed to the proper outputs. The first requirement of these control pulses is to unblock the control tubes after the three spaced leading trigger pulses which occur at the beginning of every film. The purpose of these spaced trigger pulses is to prevent unwanted unblocking of the counting tubes due to random irregularities and imperfections in the film. The unblocking after three spaced trigger pulses is accomplished through the circuit of the lower horizontal level in the drawing, including tubes 120, 122, 124 and 126. The control pulse enters the dual triode 120 (FIG. 3) which precedes the glow counter tube 122. Thus any pulse entering 120 will move the glow discharge progressively from 0 cathode around the tube, when the bias on the zero cathodes permit. The same pulse is also applied to the first grid of the delay multivibrator 126. This double triode has an anode supply at ground potential and a cathode supply at —250 volts. The first half of the tube is normally at cutoff, while the second half is conducting. A signal on the first half quickly reversed this state of affairs whereupon the second anode goes from —138 to 0 potential. By virtue of the .04 mfd. coupling condenser between tube halves, there is a delay of about 20 milliseconds before the tube returns to its original state. The moment it does, the second anode goes from 0 to —138, which bias is immediately placed on the 0 cathode of the preceding glow tube 122. Whenever such bias appears, the glow will immediately be drawn back to the 0 cathode. It will be evident that to get the glow to move up to the third cathode, a series of three pulses spaced within something less than 20 milliseconds will be necessary. This can be normally provided only by the three leading control pulses. Thus any irregular series of pulses due to film imperfections must invariably result in cancellation and the return of the glow to zero whereas the three spaced pulses will bring the glow to the 3 cathode which places a signal on the control grid of pentode 124. The signal from the plate of this tube is coupled to the grid of triode 130 and on to 134 through the double triode pulse shaper and counter driver 132. In tube 134 all cathodes are returned to —32 volts bias and will be at this potential except the glowing cathode which will have a + potential. When the pulse arrives from 132 it moves the glow off 0 cathode to 1 cathode with the result that zero cathode goes back to —32. This negative voltage then appears on the suppressor grid of 124 and serves to block this tube to incoming signals. Thus when the glow leaves zero cathode in 134 it prevents any further control pulses from passing through this branch of the circuit.

Figure 4:
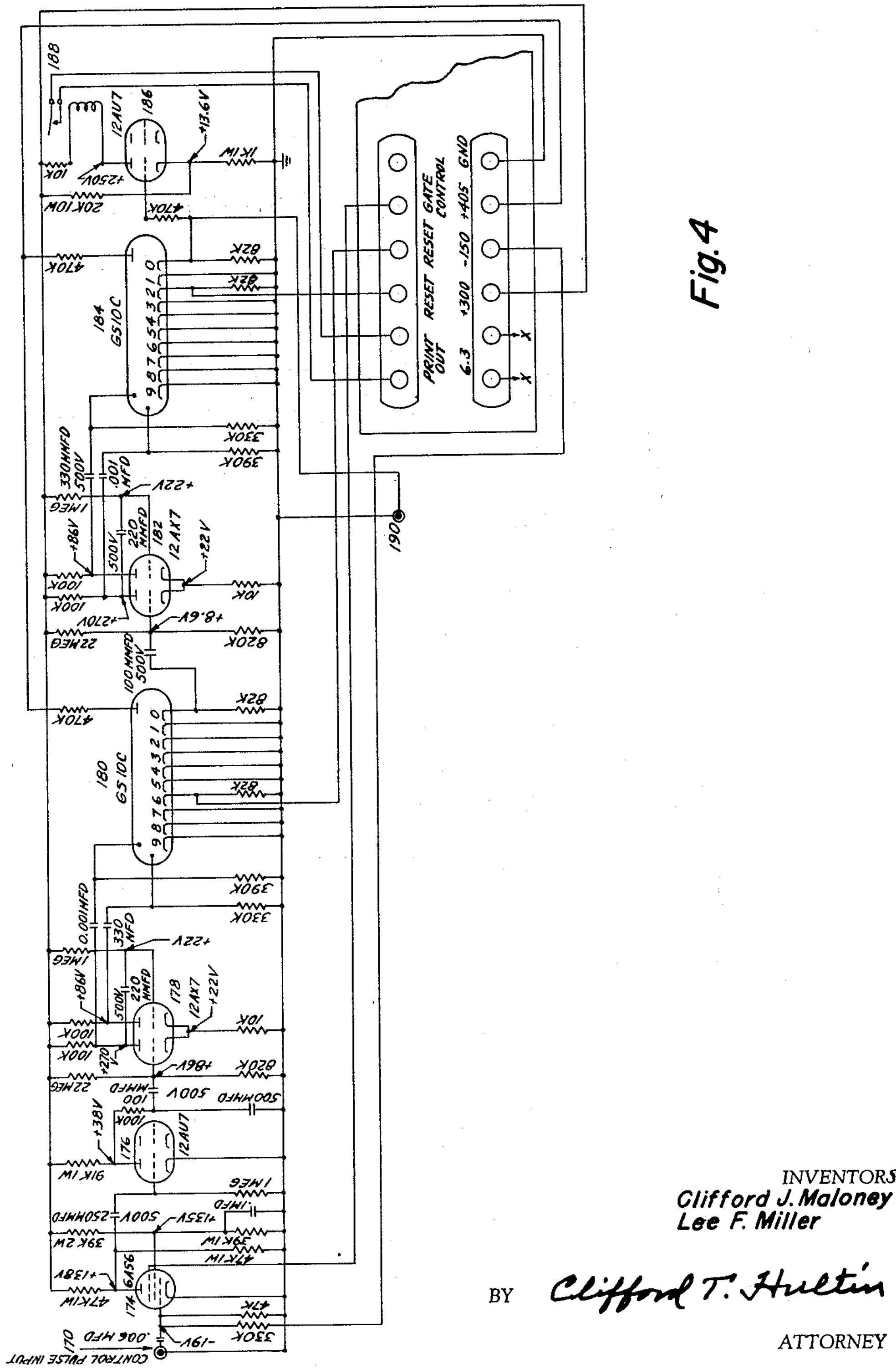
FIG. 4 shows the print out control circuit.

In the meantime, the glow on cathode 1 of tube 134, which results in a + charge on this element, is passed through diode 136 and back to the suppressor grid of 128 thereby unblocking this tube and placing it in a position to transmit control pulses directly. When the glow reaches cathode 1 of tube 134, the resulting + charge is also passed on to the suppressor grid of pentode 140 thereby unblocking this tube and permitting it to transmit data pulses from input 150. Thus the data pulses resulting from a scan following the fourth trigger pulse will appear at jack 160 and will represent the thousands integer of a number identifying the film. The fourth control pulse moves the glow to cathode 2 of tube 134 which places a + charge on the suppressor grid of pentode 142 and unblocks this tube. At the same time it blocks tube 140. The data pulses resulting from the scan following the fifth trigger pulse appear at jack 162 and represent the hundreds integer of the identifying number for the film. In like manner, the fifth and sixth control pulses open gates 144 and 146 and the resulting data pulses appear at the tens and units jacks 164 and 166 respectively. Thus data pulses following triggers 4 to 7 may result in a 4 digit number which is transferred out through jacks 160 to 166 and serve to identify the particular film that is being read. While counter 134 was advancing its glow to cathode 4 it held its own control tube 128 open through diodes 136 and 138, thereby permitting control pulses to pass. When the glow was advanced to cathode 5, control tube 148 is unblocked and control tube 128 is blocked. Therefore, after the 7th trigger pulse, the resulting control pulses are no longer effective in moving the glow beyond cathode 5. When the glow reaches the fifth cathode of 134, gate 148 is opened and remains open as long as the glow remains on the fifth cathode. Meanwhile, the scanning beam has been operating following each trigger pulse and the resulting data pulses have been fed out through output data jack 168. This feed out continues until the entire data field of 71 rows of information have been scanned. The means whereby the 71 rows of data are counted is found in the print out and control circuit shown in FIG. 4.

This circuit consists of pentode control tube 174, a triode 176 and tens and units glow counters 180 and 184 together with their drivers 178 and 182 respectively. This circuit is essentially a pre-set counter which operates a print-out relay when the counter reaches zero. Actually glow counters 180 and 184 start from count 26, so that 74 control pulses will advance the counters to zero, at which point a print-out is accomplished. The print-out counters cannot be driven, however, until the control tube 174 is unblocked. To accomplish this, the suppressor grid of this control tube connects back to cathode 5 of glow counter 134 through the gate control terminals in FIGS. 3 and 4. By this means control tube 174 is blocked until the glow in 134 reaches cathode 5. Therefore, the counting of control pulses by the print-out circuit does not commence until the identification number of the film has been registered.

As the data field is read, the following 74 control pulses drive the print-out counters to zero. When counter 184 reaches zero, the resulting 32 volt signal, off of this cathode, operates the print-out relay 188 via triode 186. The same 32 volt signal is coupled back to the control circuit via connector 190 and diode 192 through the counter drive 132 to counter 134. This additional pulse which follows the 74 control pulses moves the glow from cathode 5 to 6 in 134. At this point in the operating cycle, every control tube in the system is blocked a few milliseconds before the print-out relay operates.

The three trailing triggers following the data field are present to insure that at least 74 pulses are counted in scanning each field and that a print-out takes place after each field. A reset pulse from the operation of the punch resets all the counters for the following cycle.

Figure 5:
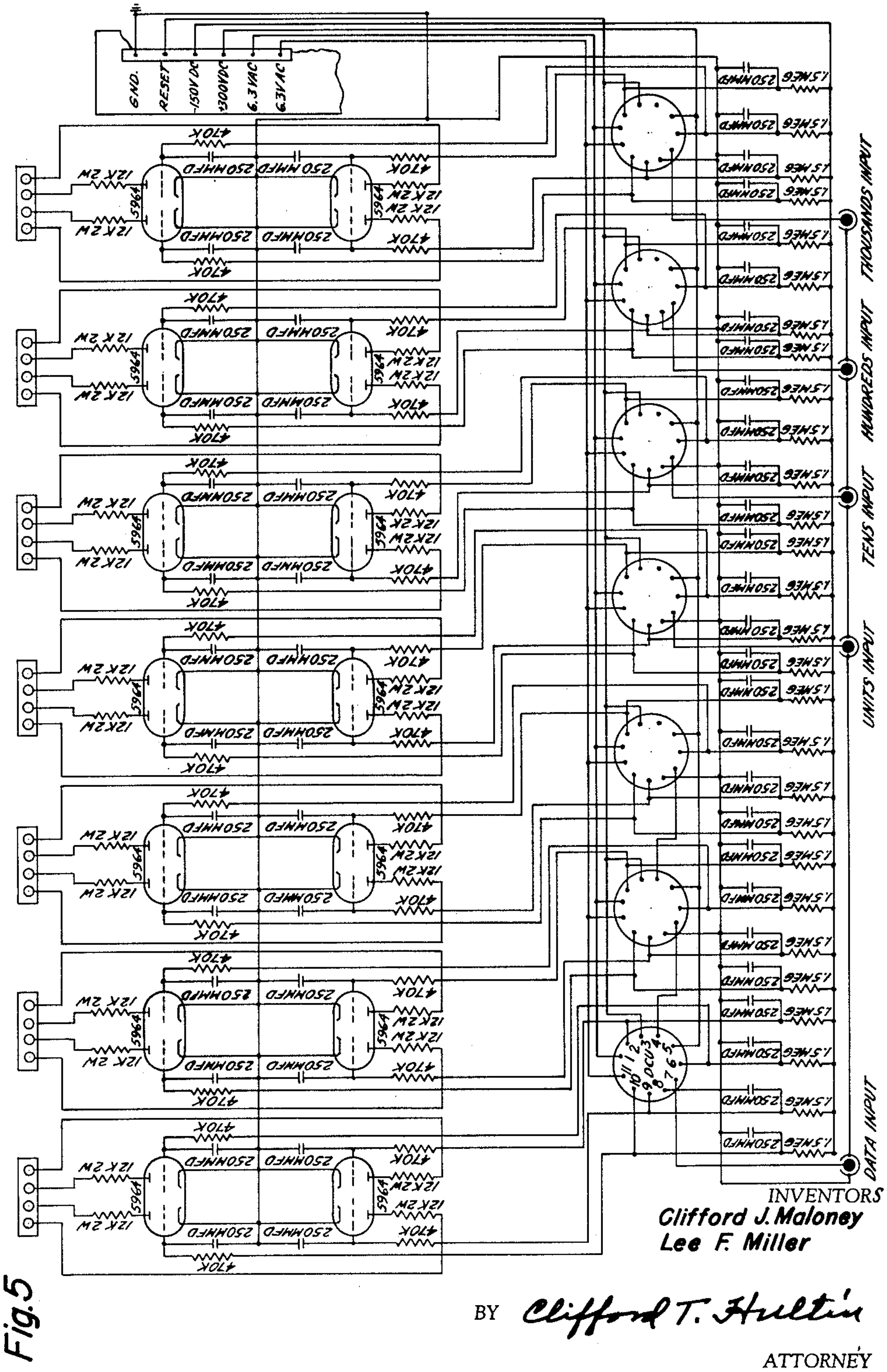
FIG. 5 shows a section of the identification and data counter circuit.

FIG. 5 represents the identification and data counter chassis with seven read out type counters. The five pulse lines from the gate control chassis (FIG. 3) drive a group of seven Berkely "readout type" decimal counting units. The first four counters are driven separately by the first four pulse lines (FIG. 1) and these register in turn the units, tens, hundreds and thousands digits of the identification number. The next three counters are connected in cascade to count up to 999 and are driven by the fifth pulse line which carry the pulses from the data field. The purpose of these counters is to total and store the pulse data as received and later furnish as read-out information the totals in each of the seven decade counters. The read-out is extracted from each of these counters through a system of 28 triode buffer tubes whose grids are connected to the four read-out leads of each counter. The plate leads of these 28 buffer tubes are connected to seven 4-prong Jones sockets and constitutes the output of this chassis.

When the print-out relay operates, it may be used to trip a punch control solenoid (FIG. 1) which starts the card punch (FIG. 1) on one punching cycle. Early in this cycle a cam switch applies voltage to the set basket circuit and the appropriate punches are operated. Near the end of the punching cycle, another cam switch operates the reset circuits so that all counters and gate circuits are ready for the next strip.

A space of 3 inches is left between each strip exposure to provide an interval of 300 milliseconds during which the card punch operates and reset is accomplished. Since the film moves continuously at 10 in./sec. the system operates at the rate of 60 cards per minute.

We claim:

1. Apparatus for reading information appearing in the form of transparent dots positioned in transverse rows on an opaque moving film, the first dot in each transverse row constituting a trigger dot, which apparatus comprises in combination a trigger light source positioned on a first side of said film adjacent the column of trigger dots, in cooperation with a trigger phototube positioned on the other side of said film, a cathode ray tube positioned on said first side of said film and a data phototube positioned on said second side of said film, an optical system in cooperation with said cathode ray tube to enable said tube to transversely scan and illuminate said film, said data phototube being positioned to receive illumination from said cathode ray tube through said film, first circuit means in cooperation with said cathode ray tube to enable said tube to transversely scan said film, a second circuit means in cooperation with said data phototube which means serves to classify and count pulses from said data phototube on the basis of the number of the horizontal row in which the pulses originate, a third circuit means in cooperation with said trigger phototube, said third circuit means serving to trigger the horizontal sweep of said cathode ray tube to scan said film transversely each time a trigger dot passes light from said trigger light source to said trigger phototube and to control said second circuit means.

2. Apparatus in accordance with claim 1 including a fourth circuit means which serves to count the number of trigger dots positioned beside the data field and to actuate a print-out mechanism after the passage of a given number of dots representing the extent of the data field.

3. Apparatus in accordance with claim 2 wherein the third circuit means includes means to open the second circuit, means to receive data pulses following a series of spaced trigger pulses to the third circuit means.

4. Apparatus in accordance with claim 3 wherein the second circuit means is adapted to independently issue the pulses in the first several scans to constitute the several integers in an identification number for the scanned film strip.

5. Apparatus in accordance with claim 3 wherein the third circuit means includes means for opening and closing electronic gates in the second circuit means to enable the several series of data pulses to be issued into the proper channels.

6. Apparatus in accordance with claim 5 wherein the first four series of data pulses are separately issued to constitute an identification number for the film and where the remaining series of data pulses are issued as a sum constituting the data for the film.

7. Apparatus in accordance with claim 5 wherein the third circuit means includes a square wave output to be applied to the grid of the cathode ray tube to intensify the beam for the forward scanning sweep and to quench the beam on the horizontal retrace.

8. Apparatus in accordance with claim 7 wherein the third circuit means includes a saw tooth wave output to trigger the sweep of the cathode ray tube scanning beam.

References Cited in the file of this patent

UNITED STATES PATENTS

| | | |
|---|---|---|
| 2,754,360 | Dersch | July 10, 1956 |
| 2,915,966 | Jacoby | Dec. 8, 1959 |